(12) United States Patent
Sundararajan et al.

(10) Patent No.: US 12,242,802 B2
(45) Date of Patent: Mar. 4, 2025

(54) PARSER TO IDENTIFY, INTERPRET, AND SUGGEST PROFESSIONAL LANGUAGE

(71) Applicant: INTERNATIONAL BUSINESS MACHINES CORPORATION, Armonk, NY (US)

(72) Inventors: Mukundan Sundararajan, Bangalore (IN); Siddharth K. Saraya, Raniganj (IN)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 17/813,611

(22) Filed: Jul. 20, 2022

(65) Prior Publication Data

US 2024/0028824 A1    Jan. 25, 2024

(51) Int. Cl.
  *G06F 40/205*  (2020.01)
  *G06F 40/30*   (2020.01)
  *G06F 40/47*   (2020.01)

(52) U.S. Cl.
  CPC ............ *G06F 40/205* (2020.01); *G06F 40/30* (2020.01); *G06F 40/47* (2020.01)

(58) Field of Classification Search
  None
  See application file for complete search history.

(56) References Cited

U.S. PATENT DOCUMENTS

| | | | |
|---|---|---|---|
| 5,960,384 A | 9/1999 | Brash | |
| 6,886,166 B2 | 4/2005 | Harrison | |
| 9,747,275 B1 * | 8/2017 | Barsness | H04L 51/52 |
| 10,650,094 B2 * | 5/2020 | Maneriker | G06F 40/169 |
| 11,194,964 B2 * | 12/2021 | Mishra | G06F 40/253 |
| 11,392,754 B2 * | 7/2022 | Nelson | G06F 40/117 |

(Continued)

FOREIGN PATENT DOCUMENTS

| | | |
|---|---|---|
| EP | 0266001 B1 | 5/1995 |
| WO | 2013142852 A1 | 9/2013 |
| WO | 2022015730 A1 | 1/2022 |

OTHER PUBLICATIONS

Mell, et al., "The NIST Definition of Cloud Computing", National Institute of Standards and Technology, Special Publication 800-145, Sep. 2011, 7 pages.

*Primary Examiner* — Douglas Godbold
(74) *Attorney, Agent, or Firm* — Daniel J Blabolil

(57) ABSTRACT

According to one embodiment, a method, computer system, and computer program product for coordinating professional language is provided. The present invention may include running, by a processor, at least one professional parsing algorithm and at least one non-professional parsing algorithm on an ingested writing; assigning, by at least one of the professional parsing algorithms and at least one of the non-professional parsing algorithms, one or more initial scores to the ingested writing; determining, by a machine learning model, one or more differences between the ingested writing and stored professional data by comparing the one or more initial scores of the ingested writing to the stored professional data; determining a variation percentage score of the ingested writing based on the differences; and transmitting at least one suggested modification of the ingested writing based on the variation percentage score to a transmitting device.

20 Claims, 7 Drawing Sheets

(56) References Cited

U.S. PATENT DOCUMENTS

| | | | |
|---|---|---|---|
| 2010/0151427 A1* | 6/2010 | Tsai | G09B 19/06 |
| | | | 434/157 |
| 2018/0211174 A1* | 7/2018 | Allen | G06N 20/00 |
| 2018/0267950 A1* | 9/2018 | de Mello Brandao | G06F 40/30 |
| 2020/0117752 A1* | 4/2020 | Liu | G06F 16/3344 |
| 2023/0133843 A1* | 5/2023 | Maurya | G06F 40/253 |
| | | | 704/9 |

\* cited by examiner

PARSER TO IDENTIFY, INTERPRET, AND SUGGEST PROFESSIONAL LANGUAGE

BACKGROUND

The present invention relates, generally, to the field of computing, and more particularly to natural language processing.

Natural language processing is a field of computing concerned with giving computers the ability to understand text in much the same way humans can. Natural language processing can enable computers to translate text from one language to another and summarize large volumes of text. Currently, natural language processing can be used to help the understanding of a language's grammatical construction and translate it into that of another language. However, to communicate, individuals may need more than just grammatical construction alone. In the professional world, words and/or phrases can become commonplace in a particular profession and individuals outside the profession may have difficulty understanding the context of words and/or phrases within the profession, leading to trouble with both interpretation and communication. Thus, an improvement in natural language processing has the potential to benefit the professional world.

SUMMARY

According to one embodiment, a method, computer system, and computer program product for coordinating professional language is provided. The present invention may include running, by a processor, at least one professional parsing algorithm and at least one non-professional parsing algorithm on an ingested writing; assigning, by at least one of the professional parsing algorithms and at least one of the non-professional parsing algorithms, one or more initial scores to the ingested writing; determining, by a machine learning model, one or more differences between the ingested writing and stored professional data by comparing the one or more initial scores of the ingested writing to the stored professional data; determining a variation percentage score of the ingested writing based on the differences; and transmitting at least one suggested modification of the ingested writing based on the variation percentage score to a transmitting device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
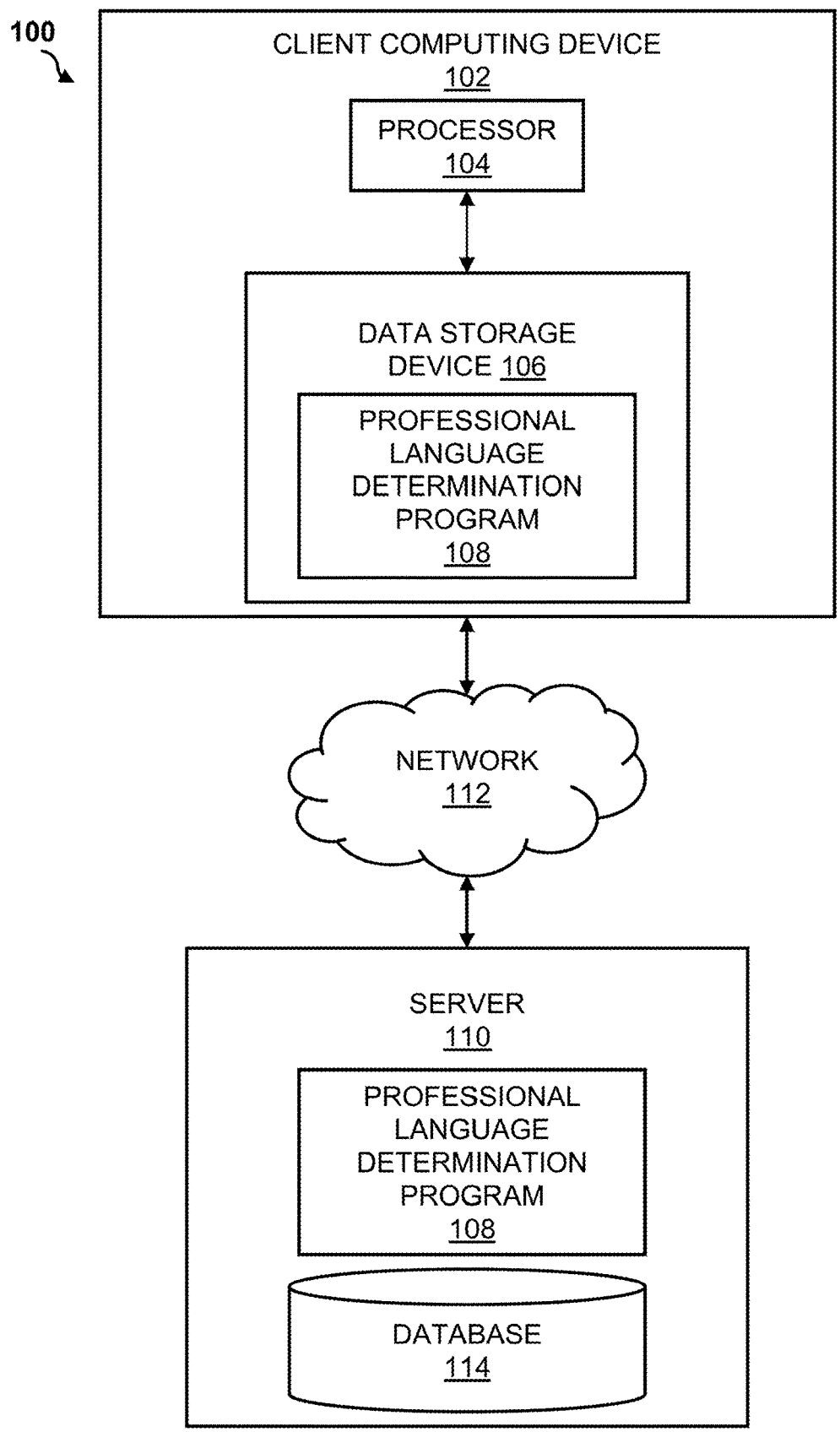
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

In the professional world, words and phrases can become commonplace in a particular profession, and individuals outside the profession may have difficulty understanding, even with the help of a parser, the context of those words and phrases. This can lead to misinterpretation and poor communication, such as in a scenario where the same terms or phrases are used by more than one profession. For example, in the business field, it may be common for a writing to contain the question "do we have the bandwidth to meet the quota this quarter?" Likewise, in the information technology field, a network problem report may contain a reference to a bandwidth outage related to internet service. As shown, bandwidth may have a unique meaning in multiple professions. In the business field, bandwidth refers to having the resources needed to conduct a task. However, in the information technology field, bandwidth refers to a range of frequencies passing over a transmission channel. There can be many such words and phrases with multiple meanings which can lead to gaps in communication. Furthermore, there may be additional lexical features present in a writing, including text structures such as patterns and sequences of words, parts of speech such as nouns and verbs, writing conventions such as punctuation, and formatting such as headings, that can lead to gaps in communication because of misinterpretation of the text by a reader. For example, the presence of incorrect section headings in a contract can lead to the misinterpretation of certain terms and/or provisions in the contract. Therefore, it may be likely that a document written for a profession by someone in another professional field is misinterpreted.

One way in which current methods attempt to address problems with communication is to utilize parsers. Parsers can break written text into smaller elements for machines to process and understand language. However, several deficiencies exist with current parsers. One of the deficiencies of current parsers is their inability to understand the context of certain text, such as the context of professional language in a professional field. For example, current parsers cannot identify an ingested writing's professional language versus its non-professional language, just the ingested writing's natural language as a whole. Another deficiency of current parsers is their inability to identify professional nuances. For example, current parsers cannot identify text structures, parts of speech, and formatting unique or common to a professional field. Additionally, current parsers cannot create suggested modifications of a writing based on a specific profession's writings. For example, a parser currently cannot provide suggested modifications coordinating the language of a writing with the professional language of a profession for which the writing is intended. Thus, an improvement of parsers, and natural language processing, as a result, has the potential to benefit communication and interpretation of writings between professionals in differing fields.

The present invention has the capacity to improve parsers by equipping them with the ability to understand the context of professional language. Accordingly, it may be advantageous to, among other things, implement a system that improves the translation of a document to the intended profession for which the document was written or to another profession in general. For example, a document written for one profession may be reformed by a person of another profession for ease of reading. The improvement of translation can be accomplished by implementing a system that uses periodically updated trained machine learning models to determine and coordinate professional language. Specifically, the program trains machine learning models using professional parsing algorithms. Furthermore, the program uses the trained machine learning models to understand the context of the professional text in an ingested writing. Additionally, the program can determine a variation percentage score of a writing and based on the variation percentage score, transmit suggested modifications of a writing to coordinate a professional document's content and language to the profession for which it was written.

According to one embodiment, the invention is a system, method, and/or computer program product for training one or more machine learning models using national language processing (NLP) algorithms and other artificial intelligence (AI) protocols. The machine learning model training can comprise NLP algorithms identifying the syntax of the input language of text, performing pattern recognition by parsing out text from ingested learning documents in a parse tree structure, and identifying entities and relationships within the text based on the parse tree structure. The data processed by the NLP algorithms can then be fed into the machine learning algorithm to train it. The machine learning algorithm can determine the similarities and differences between an ingested writing and previously ingested learning documents. The professional language determination program, herein referred to as "the program", may comprise a machine learning model for each professional field in which the program is provided learning documents. Upon ingestion of one or more learning documents, an individual, such as a subject matter expert, can select the professional field that the learning documents represent, and the program may feed the training data to the representative professional field machine learning model. A subject matter expert may be one or more persons having ordinary skill in the professional field that corresponds to the representative professional field machine learning model.

The NLP algorithms may be applied to various learning documents that are ingested and the information contained within the learning document is stored, for example, in a database. A learning document is a writing from a professional field that comprises a format that may be commonly used in writings in the profession and/or professional language used within the profession. A learning document can be machine learning training data. Also, a learning document can have its profession and format pre-identified or identified explicitly in the learning document itself. Additionally, a learning document may also be a writing identifying a list of words/terms/phrases within a profession that have meanings unique to the profession and/or a list of nuances within a profession. A learning document may also be a writing showing the structure of a type of document within the professional field. Professional language may comprise lexical features that may be unique to a profession and/or may be commonly understood by those in the profession. As an example, a contract is a document having a specific structure, such as comprising a definition section, covenants, and other articles, and can contain words/phrases commonly understood in the legal profession, such as alternate dispute resolution and objection. The learning documents can be ingested by any number of methods, such as scanning, drag/drop into a drop box, or any convenient way of feeding a document into the program. The information contained within the ingested learning documents is segregated by profession in separate files or databases to facilitate processing.

After one or more learning documents are ingested by the program, NLP algorithms can be applied to the learning documents. Professional parsing algorithms and non-professional parsing algorithms may be types of NLP algorithms that are applied to learning documents. The non-professional parsing algorithms may learn the overall language and structure of writings. The non-professional parsing algorithms may utilize linguistic and lexical features to enumerate the relationship between natural language entities within the document text. The non-professional algorithms can crawl the ingested learning documents for text and break the text into pieces, thereby capturing the lexical features. For example, the non-professional algorithms can capture the number of verbs, common nouns, and proper nouns in an ingested learning document. The non-professional parsing algorithms can be run first and can feed data output to the professional parsing algorithms.

The professional parsing algorithms may learn the unique and/or common professional language and structure within the text of writings in a professional field, thereby analyzing the ingested learning document's ratio of professional language to non-professional language. The professional parsing algorithms may detect all professional language in an ingested learning document. The professional parsing algorithms can determine the differences between the professional language in relation to the non-professional language. For example, one difference between professional language in relation to non-professional language may be the presence of professional nuances, which may comprise subtle degrees of difference in the meaning of text when used in the context of a professional field as opposed to the meaning of the text when used generally. The program may learn professional language by comparing the ingested learning document's text against a list of professional text contained within the stored professional data in the intended profession within the program's database. A profession's grammatical rules can be obtained from the analysis of text in relation to common grammar rules and determined from the expected professional differences and equivalences between the words/phrases/sentences.

In some embodiments of the invention, the program may generate one or more scores based on the ingested learning documents' ratio of professional language to non-professional language, and the ratio of each lexical feature to the total amount of text in an ingested learning document. The program can capture the number of verbs, common nouns, proper nouns, formulas, etc. In addition to parts of speech, the program may capture specific terms for a profession, including legal terms in Greek/Roman, such as "locus standi," and/or named entities, including real-world objects, such as a product and/or technique, that can be denoted with a proper name.

As the same words are repeated throughout the text, the score count may be increased by 1. Based on the crawled matter, a ratio can be derived based on the number of words per written text. Ratios can be averaged and generalized over multiple documents in the same profession. Additionally, the program can derive a ratio based on each total count of common nouns, proper nouns, verbs, adverbs, etc. Another ratio that can be derived is based on the sequencing of words, such as a common noun followed by a proper noun and then a verb, etc. Also, a ratio can be derived based on sections of text and/or paragraphs of text. The generated scores may represent the ratio of parts of speech. For example, a ratio can be derived based on comparing the number of verbs to the total number of words in the ingested learning document.

In some embodiments of the invention, the program may generate scores based on the ingested learning documents' repetition of professional language and lexical features. For example, every time the same word is repeated in an ingested learning document, the score count can be increased by 1. The generated scores may represent text detection. For example, a score can be increased by 1 each time the presence of a specific section/paragraph/phrase is detected in an ingested learning document.

When there is more than one scored learning document in a professional field, the program can average the scores of the ingested learning documents' same type of ratios and/or repetitions. The program may average the scores of the same type of ratios across multiple ingested learning documents by adding together the generated ratios from the ingested learning documents in the professional field within the stored professional data and dividing the sum of the generated ratios by the total number of learning documents. An average score may represent the general text/language/grammar type and construction of documents in a professional field. Additionally, in some embodiments of the invention, the program may combine the scores of the ingested learning documents by computing other measurements designed to identify a central tendency in the data, such as the mean, mode, and median of the scores.

The program can adjust the average scores of the ingested learning documents based on subject matter expert feedback. Subject matter expert feedback may comprise adjustments made by a subject matter expert, herein referred to as an expert, to one of the program's machine learning models. Subject matter expert feedback may allow an expert to, for example, change the weight factor associated with certain words and/or phrases, and adjust the program's intended meaning of certain sections and paragraphs, etc. For example, the weight factor of a certain word can be increased so that the score count of the word is increased by 4 each time it is detected in the ingested learning document. Subject matter expert feedback may also allow an expert to input which words/paragraphs/phrases are more important in the context of the profession and have the weight factor associated with the words/paragraphs/phrases changed. Additionally, an expert may identify a document type within a profession and sections the document would contain such as an introduction section, problem statement, available solutions, cost-benefit analysis, etc. Also, an expert may input professional nuances associated with one or more lexical features. Based on the input of an expert, the generated scores of the ingested learning documents may be updated and the average scores of the ingested learning documents can be modified accordingly. An expert may provide the rationale for the provided feedback that the program may learn, from machine learning.

Additionally, named entities, such as the Nyquist criterion or frequency plots, and/or specific words to a profession, such as "mandamus," "habeas corpus," or "phase margins," may be given higher weight factors such that each occurrence increases the score count not by 1 but by a configurable amount, for example, 5.

Typically, in natural language processing, word frequency and/or inverse document frequency may be used. In the case of a professional document, for example, an engineering document, specific named entities or words that convey specific meanings, such as Bode analysis or high inertia, can be classified as separate classes. The variation percentage score may be a simple additive computation of a figure of merit across such classes or each class may be expressed separately if there is a configurable threshold of classes.

The program can upload machine learning data, as stored professional data, from the ingested learning documents to the database. Stored professional data may be uploaded to the database as a whole and segregated by profession. The program can discard the learning documents themselves, as the periodically updated stored professional data may only comprise data obtained from the learning documents. The learning documents can be discarded after the machine learning training is completed. Stored professional data related to document types may comprise document measurements, such as margins or paragraph spacing. Stored professional data related to document types may be referred to as document type data. The program may periodically update stored professional data in the database each time a new learning document is ingested and learned, from machine learning, by the program. The period of an update may be configurable based on the number of learned documents ingested, for example, each time a new learning document is uploaded in the professional field. Typically, an update may occur because new text that has not been previously referenced in the professional field contained within the stored professional data is detected in one or more ingested learning documents. For example, a newly named entity may have been the result of a recent discovery in the professional field and is now referenced multiple times in ingested learning documents, or new words were added to a language.

By periodically updating the stored professional data in the database, the program can refine itself and stay current with professional languages and their respective writing styles. Staying current may allow the program to both regularly learn and professional language and lexical features. Additionally, in some embodiments of the invention, the program may refine itself and stay current by modifying the scoring of an ingested writing based on the differences in stored professional data over time. Specifically, lexical features present in newer stored professional data in a professional language may be weighted more heavily while lexical features present in older stored professional data in a professional language may be weighted less heavily. For example, the weight factor of a certain word can be decreased so that the score count of the word is modified to increase by only 0.5 each time it is detected in the stored professional data, while the weight factor of a certain phrase can be increased so that the score count of the phrase is increased by 2 each time it is detected in an ingested learning document.

According to one embodiment, the invention is a system, method, and/or computer program product for coordinating professional language in one professional field with professional language in one or more different professional fields by running trained machine learning models on an ingested writing, identifying professional language differences between the ingested writing and periodically updated stored professional data, determining a variation percentage score of the ingested writing based on the previously referenced differences, and transmitting suggested modifications of the ingested writing based on the variation percentage score.

The program can receive an ingested writing from a user. The writings can be ingested by any number of methods, such as scanning, drag/drop into a drop box, or any convenient way of feeding a document into the program. A user can be an individual who is providing writing to the program to coordinate the professional language in the ingested writing with the professional writing of stored professional data in the intended profession within the program's database. Upon ingestion of a writing, a user can select the document type of the ingested writing and the intended profession to which the user is coordinating the professional language in the ingested writing. Document types can comprise the type of different writings a user may upload within a professional field. For example, in the legal profession, the types of writings a user may upload can include a memorandum, different court motions, contracts, etc. An intended profession can be the professional field to which the user is coordinating the professional language in the ingested writing, such as the medical field or the field of music.

In some embodiments of the invention, the program may determine the ingested writing's document type and intended profession without input from a user. For example, the program, by machine learning, may learn the contents and/or patterns in a type of document, recognize similar contents and/or patterns in an ingested writing, and identify the document type of the ingested writing based on the similarity. In some instances, an ingested writing may relate to more than one profession, for example, a white paper on statistics may relate to education or mathematics. The various algorithms of the present invention may calculate a variation percentage score, thereby determining the likelihood that a learning document should be classified in predominately one profession. In addition, the database may comprise a user profile having preset intended professions and document types which the program may examine when determining the document type and intended profession for ingested writings. A user's profile may be associated with the professional field in which a user coordinates the professional language of ingested writings.

The program may run at least two NLP algorithms on the ingested writing. In some embodiments of the invention, the program may generate one or more initial scores of the ingested writing based on the document's ratio of professional language to non-professional language, and the ratio of each lexical feature to the total amount of text in an ingested writing, using the professional and non-professional algorithms. The process of generating one or more initial scores of the ingested writing can be substantially similar to the process of generating one or more scores of the ingested learning documents as above, except that the initial scores refer only to the scoring of ingested writings and not ingested learning documents. In some embodiments of the invention, the program may generate initial scores based on the ingested writing's repetition of professional language and lexical features.

The program may run at least one of the trained machine learning models on the ingested writing to identify the differences between the ingested writing and periodically updated stored professional data within the intended profession based on the generated initial scores. The machine learning model can determine the similarities and differences after being fed the scoring output of the NLP algorithms. The machine learning model may represent the rules, numbers, and any other algorithm-specific data structures required to make suggested modifications to ingested writings. Also, the machine learning model may comprise both data and a procedure for using stored professional data to make one or more suggested modifications to an ingested writing. The differences may be based on the comparison of the ingested writing's ratio of professional language to non-professional language, the ratio of each lexical feature to the average stored professional data within the intended field, and/or the repetition of each lexical feature. For example, the program may identify a difference in the initial score regarding the presence of a specific section/paragraph/phrase in the ingested writing versus the average presence of that specific section/paragraph/phrase in the periodically updated stored professional data within the intended profession.

The program, using the machine learning model, may determine a variation percentage score based on the differences between the ingested writing and periodically updated stored professional data within the intended profession. The variation percentage score can be determined based on the comparison of the previously generated initial scores of the ingested writing to the stored professional data. Specifically, the variation percentage score may be determined by comparing each generated initial score to the respective average generated score of the stored professional data within the professional field. A percent difference may be generated based on the relationship between each generated initial score and the respective average generated score. All the percentage differences can be weighted together to determine an overall variation percentage score. The variation percentage score can represent gaps in communication that might arise between different professionals. Specifically, the variation percentage score, expressed as a percentage, can be based on how closely related the professional language of the ingested writing is to the stored professional data in the professional field. For example, the variation percentage score may represent that the construction of certain sections/paragraphs/phrases is not closely aligned to the construction of certain sections/paragraphs/phrases according to legal criteria. Additionally, for example, the variation percentage score may represent that the ratio of the number of verbs to the number of total words present in the ingested writing is not equal to the stored professional data average ratio of the number of verbs to the number of total words in the professional field. For example, a variation score of 80% may represent that 80% of the ingested writing's text is coordinated with the professional language of the periodically updated stored professional data within the intended profession. The higher the variation percentage score can indicate a greater occurrence of specific and important professional lexical features and professional language.

The program may transmit suggested modifications of the ingested writing based on the ingested writing's variation percentage score. The suggested modifications of the ingested writing may comprise improvements to the ingested writing that would coordinate the ingested writing with the document type and professional language of stored professional data in the intended profession within the program's database. For example, the variation percentage score of an ingested writing may be 51%. A lower variation percentage score may indicate that the ingested writing may need to be adjusted to comprise more professional language in order to coordinate the professional language of the ingested writing with the average score of professional language in learned documents in the legal profession. Specifically, the suggested modifications of the ingested writing may comprise the addition or modification of certain words and/or phrases that are normally found in the professional field to increase the variation percentage score of the ingested writing. For example, in a sports journalism writing about a basketball game, a suggested modification may recommend that the phrase "the player had 18 goals" be changed to "the player had 18 points". Additionally, the suggested modifications of the ingested writing may comprise formatting changes to coordinate the formatting of the ingested writing more closely with the document type in the intended profession. For example, the suggested modifications of the ingested writing may comprise adding headings, such as point headings in a legal memorandum, to certain sections of the ingested writing. Also, the suggested modifications of the ingested writing may comprise implementing professional nuances present in the respective professional field into the text of the ingested writing. For example, if the ingested writing was a contract, the program may suggest that terms that are defined in the definition section be capitalized throughout the contract, such that a reader can be assured of a word's meaning when a defined word is used in the contract.

The program may transmit the suggested modifications of the ingested writings to an output device. The output device may be a device for displaying text, such as a monitor or a mobile device, or may be a device for electronic transfer of text and/or a printer. In addition, an output device may display the original ingested writing side-by-side with the ingested writing comprising the suggested modifications. A user can choose to implement the suggested modifications to the ingested writing. By implementing the suggested modifications to the ingested writing, a user can reduce the gaps in communication between two different professionals and improve the translation of a document to the intended profession.

An exemplary use of the invention may involve the program coordinating the language of an ingested writing written by a layperson to the professional language in the legal profession. In this way, a layperson can better represent themselves in a legal proceeding. Specifically, a layperson, named Jacqueline, may want to represent herself in a legal proceeding even though Jacqueline is an investment banker and has no prior experience in the legal field. Jacqueline can draft a complaint and by using the program, coordinate the language in her complaint to the professional language in the legal profession. After writing the complaint, Jacqueline can upload the complaint, allowing the program to receive the ingested writing. Jacqueline can specify that her writing represented a complaint and that it was intended for the legal profession. The program may run the legal profession machine learning model on the ingested complaint to generate initial scores of the complaint. For example, the program may detect the presence of the term "plaintiff" in the complaint and increase the count of the initial score by 1 each time "plaintiff" is detected in the complaint. The program can derive a ratio based on the initial score count of "plaintiff" to the number of total words in the complaint. Based on the initial scores of the ingested complaint, the program may identify the differences between the complaint and the stored professional data within the legal profession. For example, the stored professional data in the legal profession may represent an average score of 1 based on the presence of a caption section in a complaint and here, the program generates an initial score of 0 regarding the absence of a caption section in the ingested complaint. Therefore, the program identifies a missing section as one of the differences between the complaint and the stored professional data in the legal profession. Based on the differences between the complaint and the stored professional data within the legal profession, the program may determine a variation percentage score of the complaint. For example, the program may determine that the complaint has a variation percentage score of 42%, representing that the complaint needs to comprise more legal language in order to coordinate the professional language in the complaint with the average scores of the stored professional data within the legal profession. Based on the variation percentage score of the complaint, the program may transmit suggested modifications of the complaint to Jacqueline. For example, the program may suggest that the complaint contain a caption indicating the name of the court and county, the parties to the case, the case number, and the title of the document. Based on the suggested modifications of the ingested writing, Jacqueline may implement the suggested modifications to her complaint. By implementing the suggested modifications to her complaint, Jacqueline can reduce the gaps in communication between her and professionals in the legal field and thus, improve the translation of her complaint to the legal profession.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to run professional and non-professional parsing algorithms on an uploaded document, identify the differences between the uploaded document and periodically updated stored professional data, determine a variation percentage score based on the differences between the documents, and transmit suggested modifications of the uploaded document to a user based on the variation percentage score.

Referring to FIG. 1, an exemplary networked computer environment 100 is depicted, according to at least one embodiment. The networked computer environment 100 may include client computing device 102 and a server 110 interconnected via a communication network 112. According to at least one implementation, the networked computer environment 100 may include a plurality of client computing devices 102 and servers 110, of which only one of each is shown for illustrative brevity.

The communication network 112 may include various types of communication networks, such as a wide area network (WAN), local area network (LAN), a telecommunication network, a wireless network, a public switched network and/or a satellite network. The communication network 112 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a professional language determination program 108 and communicate with the server 110 via the communication network 112, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 102 may include internal components 502a and external components 504a, respectively.

The server computer 110 may be a laptop computer, netbook computer, personal computer (PC), a desktop computer, or any programmable electronic device or any network of programmable electronic devices capable of hosting and running a professional language determination program 108 and a database 114 and communicating with the client computing device 102 via the communication network 112, in accordance with embodiments of the invention. As will be discussed with reference to FIG. 5, the server computer 110 may include internal components 502b and external components 504b, respectively. The server 110 may also operate in a cloud computing service model, such as Software as a Service (SaaS), Platform as a Service (PaaS), or Infrastructure as a Service (IaaS). The server 110 may also be located in a cloud computing deployment model, such as a private cloud, community cloud, public cloud, or hybrid cloud.

The database 114 may be a digital repository capable of data storage and data retrieval. The database 114 can be present in the server 110 and/or the client computing device 102 and/or any other location in the network 112. The database 114 may include a lexicon that comprises the professional fields and their respective professional data, document type data, professional and non-professional language, and user profiles.

According to the present embodiment, the professional language determination program 108 may be a program 108 capable of training machine learning models using professional parsing algorithms, using the trained machine learning models to understand the context of the professional text in an ingested writing, determining a variation percentage score of the ingested writing, and based on the variation percentage score, transmitting suggested modifications of the writing to coordinate an ingested writing's content and language to the profession for which it was written. The program 108 may be located on client computing device 102 or server 110 or on any other device located within network 112. Furthermore, professional language determination program 108 may be distributed in its operation over multiple devices, such as client computing device 102 and server 110. The professional language determination method is explained in further detail below with respect to FIG. 2.

Figure 2:
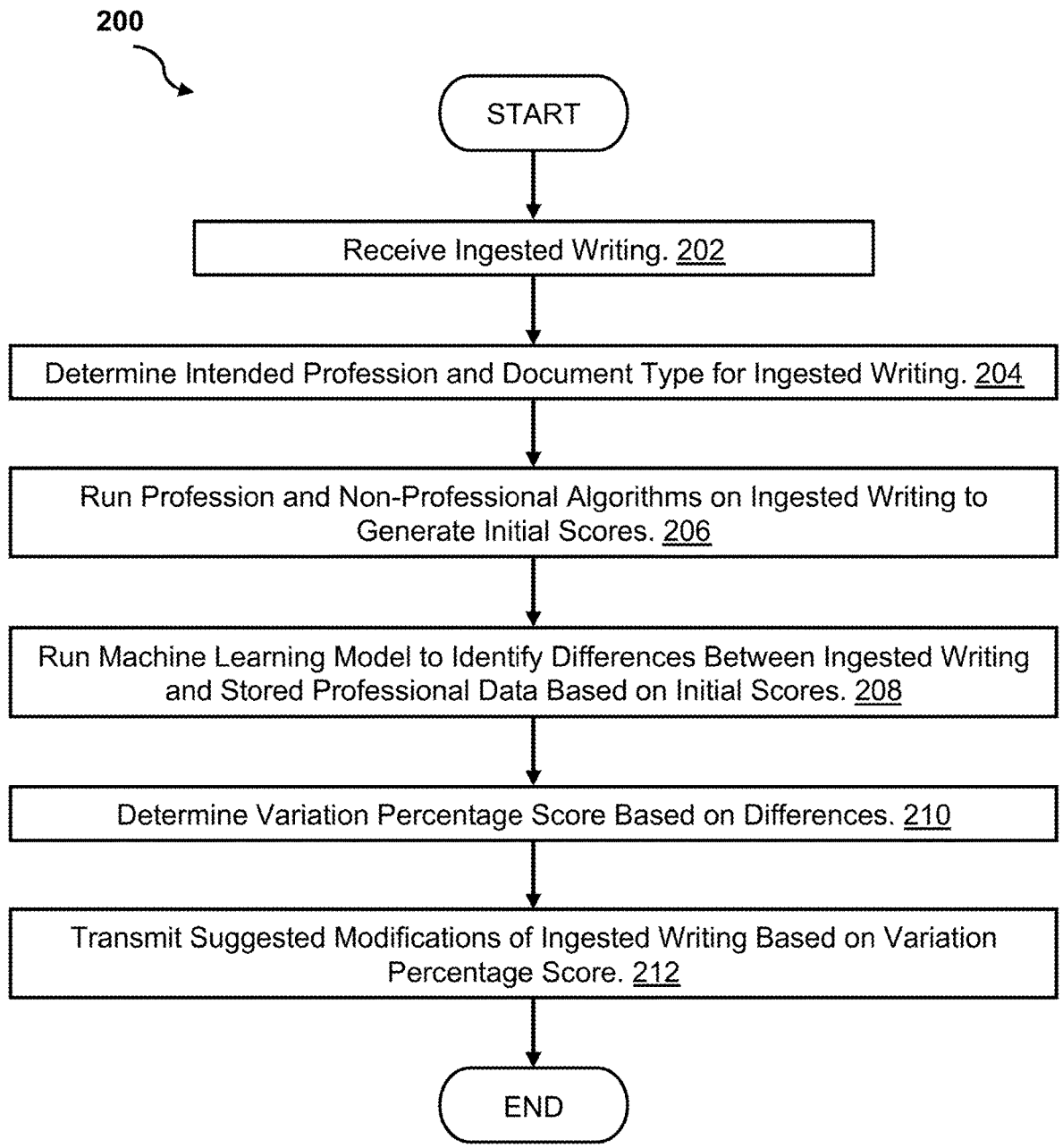
FIG. 2 is an operational flowchart illustrating a professional language determination process according to at least one embodiment.

Referring now to FIG. 2, an operational flowchart illustrating a professional language determination process 200 is depicted according to at least one embodiment. At 202, the program 108 receives an ingested writing from a user. The writings can be ingested by any number of methods, such as scanning, drag/drop into a drop box, or any convenient way of feeding a document into the program 108.

At 204, the program 108 determines the ingested writing's document type and intended profession. Upon ingestion of a writing, a user can select the document type of the ingested writing and the intended profession to which the user is coordinating the professional language in the ingested writing. In some embodiments of the invention, the program 108 may determine the ingested writing's document type and intended profession without input from a user by recognizing similar contents and/or patterns in an ingested writing from previously learned contents and/or patterns. In addition, the database 114 may comprise a user profile having preset intended professions and document types which the program 108 may examine when determining the document type and intended profession for ingested writings.

At 206, the program 108 runs at least two NLP algorithms on the ingested writing to generate one or more initial scores. In some embodiments of the invention, the program 108 may generate one or more initial scores of the ingested writing based on the document's ratio of professional language to non-professional language, and/or the ratio of each lexical feature to the total amount of text in an ingested writing, using the professional and non-professional algorithms. In some embodiments of the invention, the program 108 may generate initial scores based on the ingested writing's repetition of professional language and lexical features.

At 208, the program 108 can run a machine learning model to identify the differences between the ingested writing and periodically updated stored professional data within the intended profession based on the generated initial scores. The machine learning model can determine the similarities and differences after being fed the scoring output of the NLP algorithms. The differences may be based on the comparison of the ingested writing's ratio of professional language to non-professional language, the ratio of each lexical feature to the average stored professional data within the intended field, and/or the repetition of each lexical feature. The machine learning model may have been trained through a learning process set forth in greater detail below with respect to FIG. 3.

At 210, the program 108, using the machine learning model, determines a variation percentage score based on the differences between the ingested writing and periodically updated stored professional data within the intended profession. The variation percentage score can be determined based on the comparison of the previously generated initial scores of the ingested writing to the stored professional data. Specifically, the variation percentage score may be determined by comparing each generated initial score to the respective average generated score of the stored professional data within the professional field. A percent difference may be generated based on the relationship between each generated initial score and the respective average generated score. All the percentage differences can be weighted together to determine an overall variation percentage score. The variation percentage score can represent gaps in communication that might arise between different professionals. Specifically, the variation percentage score, expressed as a percentage, can be based on how closely related the professional language of the ingested writing is to the stored professional data in the professional field.

At 212, the program 108 transmits suggested modifications of the ingested writing to a user based on the ingested writing's variation percentage score. The suggested modifications of the ingested writing may comprise improvements to the ingested writing that would coordinate the ingested writing with the document type and professional language of stored professional data in the intended profession within the program's 108 database 114. A lower variation percentage score may indicate that the ingested writing may need to be adjusted to comprise more professional language in order to coordinate the professional language of the ingested writing with the average scores of professional language in learned documents in the legal profession. The higher the variation percentage score can indicate a greater occurrence of specific and important professional lexical features and professional language. Specifically, the suggested modifications of the ingested writing may comprise the addition or modification of certain words and/or phrases that are normally found in the professional field to increase the variation percentage score of the ingested writing. Additionally, the suggested modifications of the ingested writing may comprise formatting changes to coordinate the formatting of the ingested writing more closely with the document type in the intended profession. Also, the suggested modifications of the ingested writing may comprise implementing professional nuances present in the respective professional field into the text of the ingested writing. The program 108 may transmit the suggested modifications of the ingested writings to a user via an output device 414. The output device 414 may be a device for displaying text, such as a monitor or a mobile device, or may be a device for electronic transfer of text and/or a printer.

Figure 3:
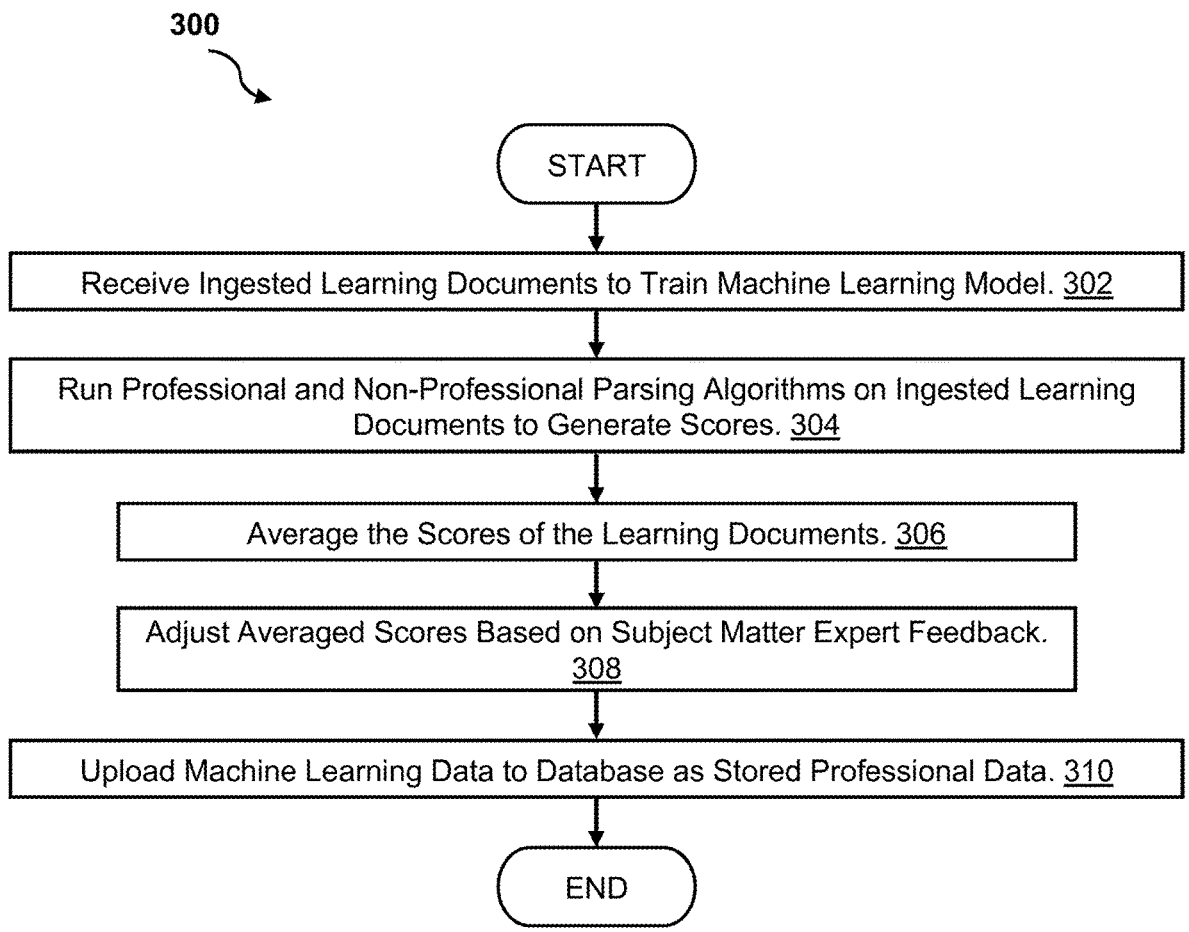
FIG. 3 is an operational flowchart illustrating a professional language learning process according to at least one embodiment.

Referring now to FIG. 3, an operational flowchart illustrating a professional language learning process 300 is depicted according to at least one embodiment. At 302, the professional language determination program 108 receives ingested learning documents to train the machine learning model. The learning documents can be ingested by any of the methods listed above in step 202.

At 304, the program 108 runs professional and non-professional parsing algorithms on the ingested learning documents to generate one or more scores. The process of generating one or more scores of the ingested learning documents can be substantially similar to the process of generating one or more initial scores of an ingested writing as stated above in step 206, except that the scores refer only to the scoring of ingested learning documents and not ingested writings.

At 306, the program 108 averages the scores of the ingested learning documents within the professional field. The program 108 can average the scores of the ingested learning documents' ratio of professional language to non-professional language, each lexical feature ratio, and the ingested learning documents' repetition of professional language and lexical features. The program 108 may average the scores of the same type of ratios across multiple ingested learning documents by adding together the generated ratios from the ingested learning documents in the professional field within the stored professional data and dividing the sum of the generated ratios by the total number of learning documents. An average score may represent the general text/language/grammar type and construction of documents in a professional field.

At 308, the program 108 adjusts the average scores of the ingested learning documents based on subject matter expert feedback. Subject matter expert feedback may comprise adjustments made by a subject matter expert to one of the program's 108 machine learning models. Based on the input of a subject matter expert, the generated scores of the ingested learning documents may be updated and thus, the average scores of the ingested learning documents can be modified as well.

At 310, the program 108 uploads the machine learning data, as stored professional data, from the ingested learning documents to the database 114. Stored professional data may be uploaded to the database 114 as a whole and segregated by profession. The program 108 can discard the learning documents themselves, as the periodically updated stored professional data may only comprise data obtained from the learning documents. The learning documents can be discarded after the machine learning training is completed. The program 108 may periodically update stored professional data in the database 114 each time a new learning document is ingested and learned, from machine learning, by the program 108.

Figure 4:
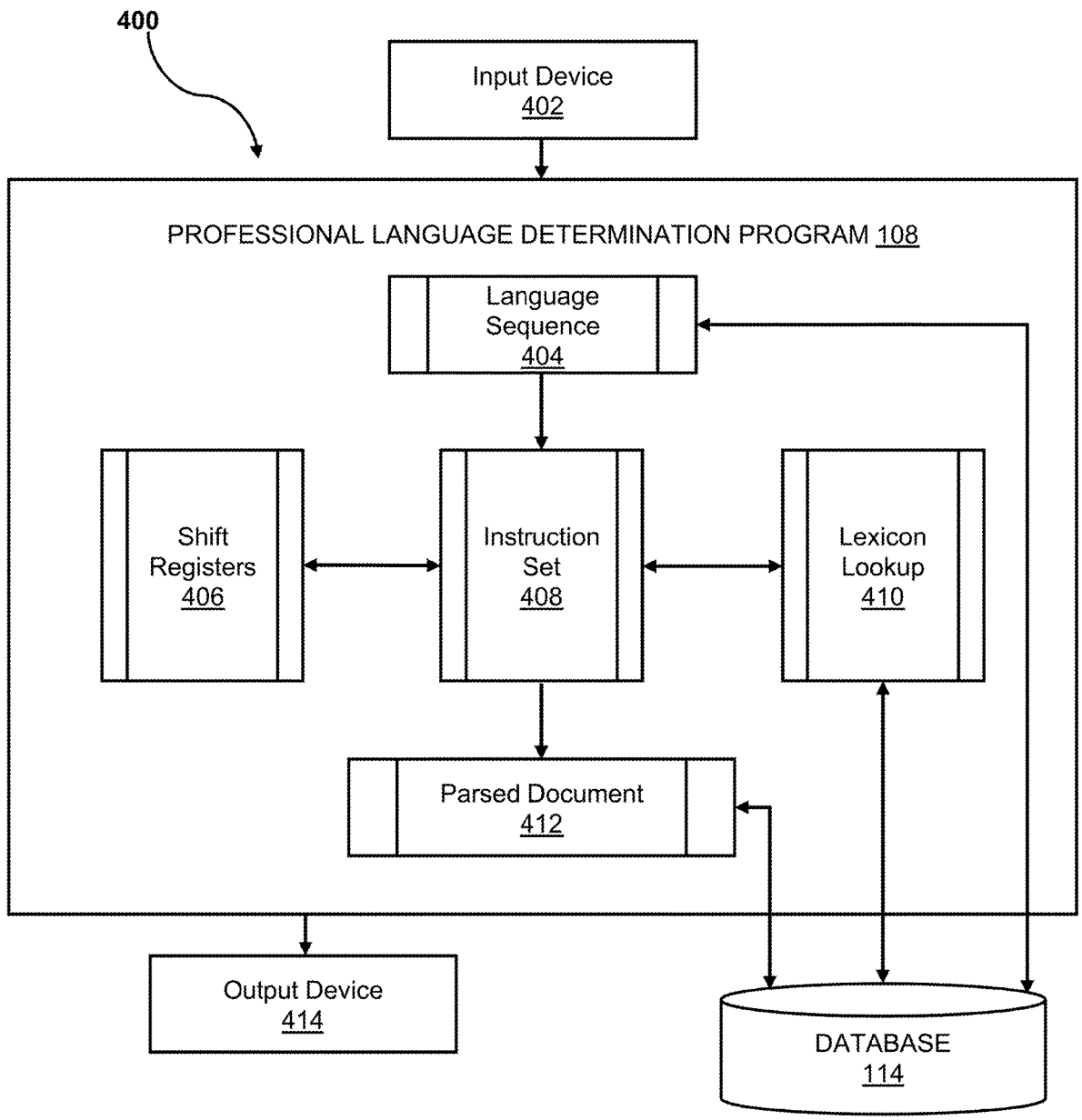
FIG. 4 is a system diagram illustrating an exemplary program environment of an implementation of a professional language determination process depicted according to at least one embodiment.

Referring now to FIG. 4, a system diagram illustrating an exemplary program environment 400 of an implementation of a professional language determination process 200 is depicted according to at least one embodiment. Here, the program 108 comprises a language sequence module 404, a shift registers module 406, an instruction set module 408, a lexicon lookup module 410, and a parsed document module 412. The exemplary program environment 400 details the interactions between the language sequence module 404 and the instruction set module 408, the instruction set module 408 and the shift registers module 406, the instruction set module 408 and the lexicon lookup module 410, and the instruction set module 408 and the parsed document module 412. Additionally, the exemplary program environment 400 details the interactions between the input device 402 and the professional language determination program 108, the professional language determination program 108 and the output device 414, the lexicon lookup module 410 and the database 114, the language sequence module 404 and the database 114, and the parsed document module 412 and the database 114.

The input device 402 may be a device for uploading a writing/learning document to the program 108, such as a scanner. The language sequence module 404 may be used to pull the text sequences from the ingested writing/learning document as the program 108 is parsing them. The shift registers module 406 can be memory where words or symbols are placed within and moved as an ingested writing/learning document is parsed. The instruction set module 408 may be used for NLP algorithm steps and machine learning algorithm steps. The lexicon lookup module 410 may be used to look up professional, non-professional, and machine learning data stored in the lexicon comprised within the database 114. The parsed document module 412 may be used to place the ingested writing/learning document after the NLP algorithms and machine learning algorithms have been run on the ingested writing/learning document and thus, is ready to be transmitted to the output device. The output device 414 may be a device for displaying text, such as a monitor or a mobile device, or may be a device for electronic transfer of text and/or a printer.

It may be appreciated that FIGS. 2-4 provide only illustrations of implementation and do not imply any limitations with regard to how different embodiments may be implemented. Many modifications to the depicted environments may be made based on design and implementation requirements.

Figure 5:
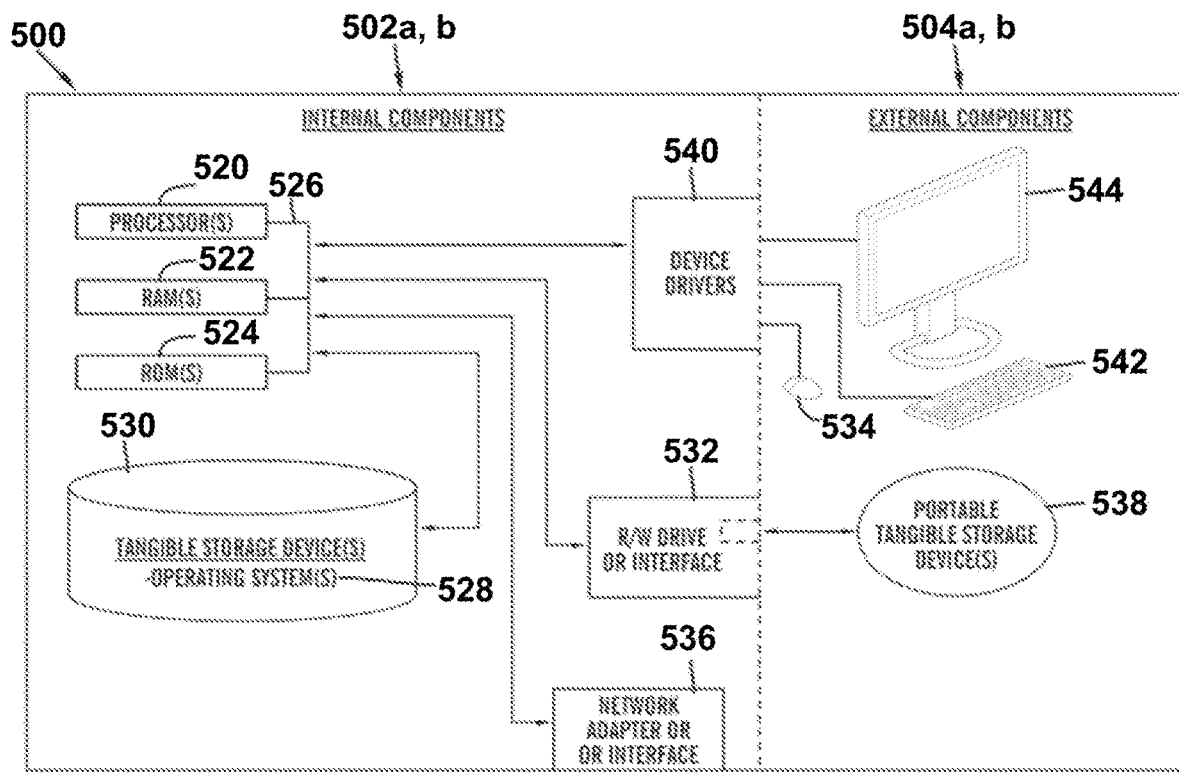
FIG. 5 is a block diagram of internal and external components of computers and servers depicted in FIG. 1 according to at least one embodiment.

FIG. 5 is a block diagram 500 of internal and external components of the client computing device 102 and the server 110 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, and 504 is representative of any electronic device capable of executing machine-readable program instructions. The data processing system 502, and 504 may be representative of a smart phone, a computer system, PDA, or other electronic devices. Examples of computing systems, environments, and/or configurations that may be represented by the data processing system 502, and 504 include, but are not limited to, personal computer systems, server computer systems, thin clients, thick clients, hand-held or laptop devices, multiprocessor systems, microprocessor-based systems, network PCs, mini-computer systems, and distributed cloud computing environments that include any of the above systems or devices.

The client computing device 102 and the server 110 may include respective sets of internal components 502 a, b and external components 504 a, b illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the professional language determination program 108 in the client computing device 102, and the professional language determination program 1108 in the server 110 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 a, b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the professional language determination program 108, can be stored on one or more of the respective portable computer-readable tangible storage devices 538, read via the respective R/W drive or interface 532, and loaded into the respective hard drive 530.

Each set of internal components 502 a, b also includes network adapters or interfaces 536 such as a TCP/IP adapter cards, wireless Wi-Fi interface cards, or 3G or 4G wireless interface cards or other wired or wireless communication links. The professional language determination program 108 in the client computing device 102 and the professional language determination program 108 in the server 110 can be downloaded to the client computing device 102 and the server 110 from an external computer via a network (for example, the Internet, a local area network or other, wide area network) and respective network adapters or interfaces 536. From the network adapters or interfaces 536, the professional language determination program 108 in the client computing device 102 and the professional language determination program 108 in the server 110 are loaded into the respective hard drive 530. The network may comprise copper wires, optical fibers, wireless transmission, routers, firewalls, switches, gateway computers and/or edge servers.

Each of the sets of external components 504 a, b can include a computer display monitor 544, a keyboard 542, and a computer mouse 534. External components 504 a, b can also include touch screens, virtual keyboards, touch pads, pointing devices, and other human interface devices. Each of the sets of internal components 502 a, b also includes device drivers 540 to interface to computer display monitor 544, keyboard 542, and computer mouse 534. The device drivers 540, RAY drive or interface 532, and network adapter or interface 536 comprise hardware and software (stored in storage device 530 and/or ROM 524).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
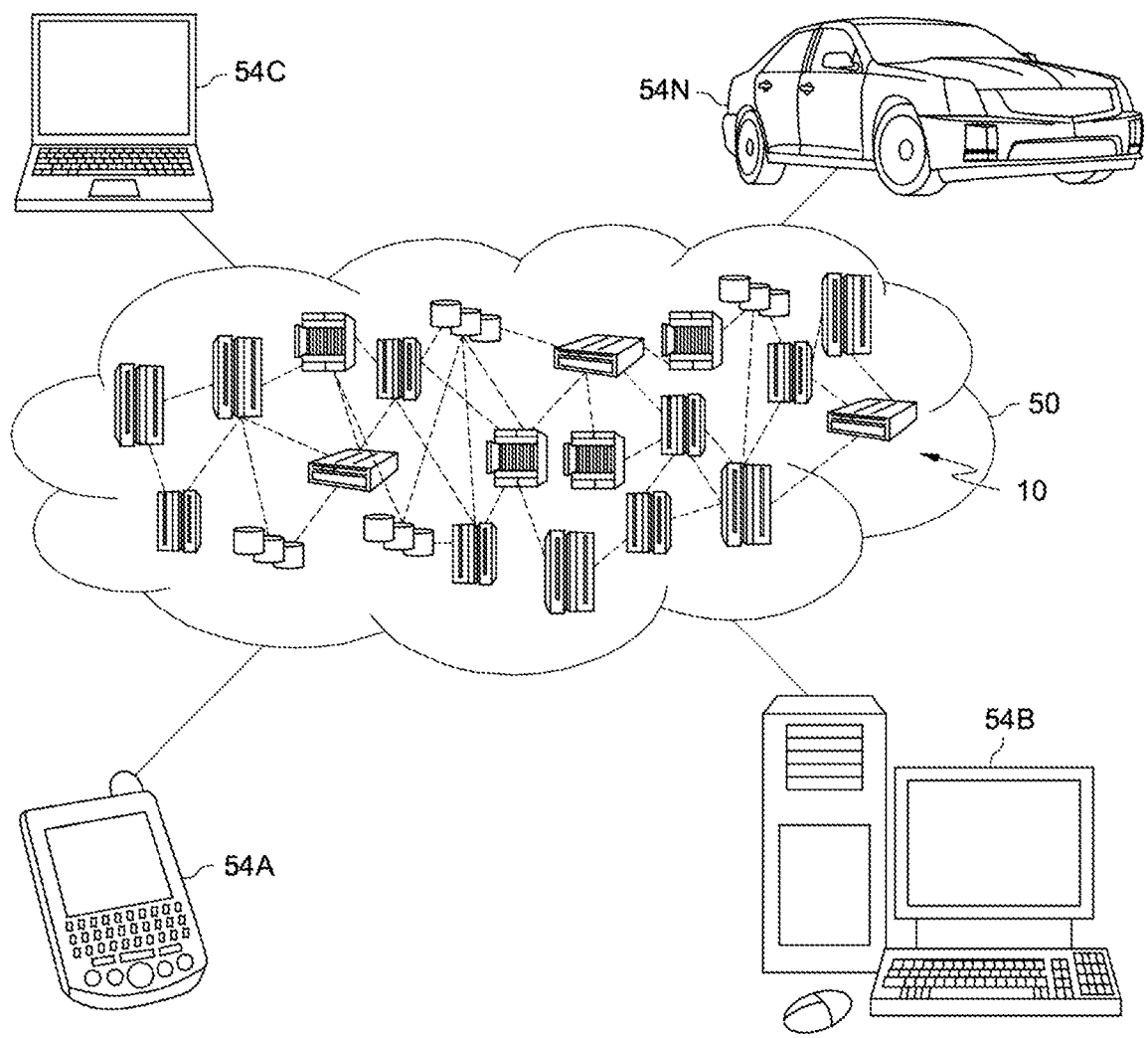
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
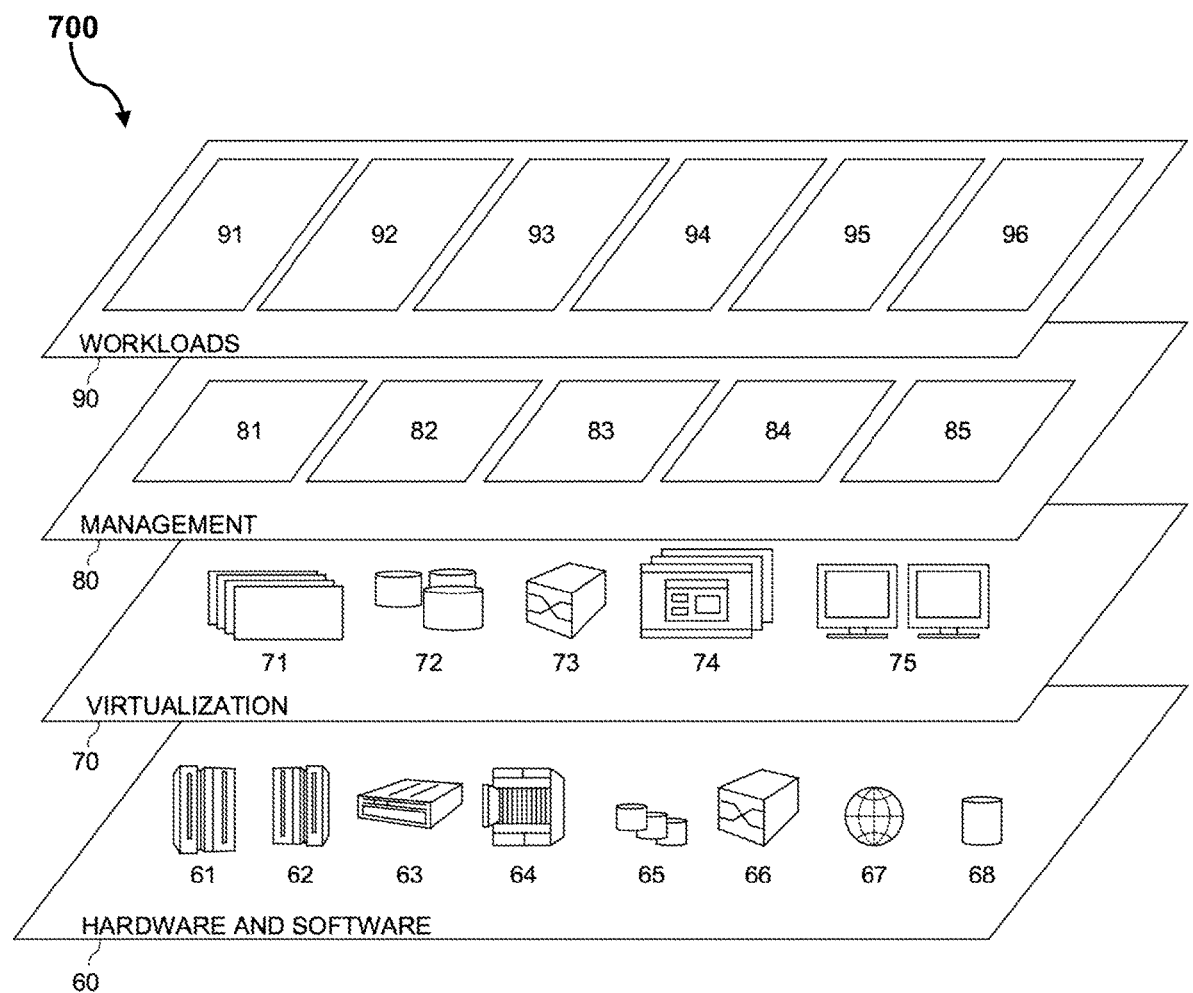
FIG. 7 depicts abstraction model layers according to an embodiment of the present invention.

Referring now to FIG. 7, a set of functional abstraction layers 700 provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and professional language determination program 96. The professional language determination program 96 coordinates professional language in one professional field with one or more different professional fields training machine learning models using professional parsing algorithms, using the trained machine learning models to understand the context of the professional text in an ingested writing, determining a variation percentage score of the ingested writing, and based on the variation percentage score, transmitting suggested modifications of the writing to coordinate an ingested writing's content and language to the profession for which it was written.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for coordinating professional language, the method comprising:
   running, by a processor, at least one professional parsing algorithm and at least one non-professional parsing algorithm on an ingested writing;
   assigning, by at least one of the professional parsing algorithms and at least one of the non-professional parsing algorithms, at least two initial scores to the ingested writing, wherein the at least two initial scores are based on a ratio of professional language to non-professional language in the ingested writing, a ratio of each lexical feature in the ingested writing to a total amount of text in the ingested writing, and repetition of the professional language and each of the lexical features;

determining, by a machine learning model, one or more differences between stored professional data and the ingested writing by comparing the at least two initial scores of the ingested writing to the stored professional data;

determining a variation percentage score of the ingested writing based on the differences; and transmitting at least one suggested modification of the ingested writing based on the variation percentage score to a transmitting device.

2. The method of claim 1, wherein the stored professional data comprises one or more scores of ingested learning documents determined by at least one of the professional parsing algorithms and at least one of the non-professional parsing algorithms.

3. The method of claim 1, wherein the stored professional data comprises document type data determined by at least one of the professional parsing algorithms and at least one of the non-professional parsing algorithms.

4. The method of claim 1, wherein the stored professional data is modified when one or more new ingested learning documents are scored by at least one of the professional parsing algorithms and at least one of the non-professional parsing algorithms, and uploaded to the stored professional data.

5. The method of claim 1, further comprising:
training the machine learning model, wherein the training is accomplished by crawling ingested learning documents for text, generating scores of the ingested learning documents, and storing the scores of the ingested learning documents.

6. The method of claim 1, further comprising:
determining, by the machine learning model, a document type of the ingested writing.

7. The method of claim 1, further comprising:
determining, by the machine learning model, an intended profession associated with the ingested writing.

8. A computer system for coordinating professional language, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
running at least one professional parsing algorithm and at least one non-professional parsing algorithm on an ingested writing;
assigning, by at least one of the professional parsing algorithms and at least one of the non-professional parsing algorithms, at least two initial scores to the ingested writing, wherein the at least two initial scores are based on a ratio of professional language to non-professional language in the ingested writing, a ratio of each lexical feature in the ingested writing to a total amount of text in the ingested writing, and repetition of the professional language and each of the lexical features;
determining, by a machine learning model, one or more differences between stored professional data and the ingested writing by comparing the at least two initial scores of the ingested writing to the stored professional data;
determining a variation percentage score of the ingested writing based on the one or more differences; and
transmitting at least one suggested modification of the ingested writing based on the variation percentage score to a transmitting device.

9. The computer system of claim 8, wherein the stored professional data comprises one or more scores of ingested learning documents determined by at least one of the professional parsing algorithms and at least one of the non-professional parsing algorithms.

10. The computer system of claim 8, wherein the stored professional data comprises document type data determined by at least one of the professional parsing algorithms and at least one of the non-professional parsing algorithms.

11. The computer system of claim 8, wherein the stored professional data is modified when one or more new ingested learning documents are scored by at least one of the professional parsing algorithms and at least one of the non-professional parsing algorithms, and uploaded to the stored professional data.

12. The computer system of claim 8, further comprising:
training the machine learning model, wherein the training is accomplished by crawling ingested learning documents for text, generating scores of the ingested learning documents, and storing the scores of the ingested learning documents.

13. The computer system of claim 8, further comprising:
determining, by the machine learning model, a document type of the ingested writing.

14. The computer system of claim 8, further comprising:
determining, by the machine learning model, an intended profession associated with the ingested writing.

15. A computer program product for coordinating professional language, the computer program product comprising:
one or more computer-readable tangible storage medium and program instructions stored on at least one of the one or more tangible storage medium, the program instructions executable by a processor to cause the processor to perform a method comprising:
running at least one professional parsing algorithm and at least one non-professional parsing algorithm on an ingested writing;
assigning, by at least one of the professional parsing algorithms and at least one of the non-professional parsing algorithms, at least two initial scores to the ingested writing, wherein the at least two initial scores are based on a ratio of professional language to non-professional language in the ingested writing, a ratio of each lexical feature in the ingested writing to a total amount of text in the ingested writing, and repetition of the professional language and each of the lexical features;
determining, by a machine learning model, one or more differences between stored professional data and the ingested writing by comparing the at least two initial scores of the ingested writing to the stored professional data;
determining a variation percentage score of the ingested writing based on the differences; and
transmitting at least one suggested modification of the ingested writing based on the variation percentage score to a transmitting device.

16. The computer program product of claim 15, wherein the stored professional data comprises one or more scores of ingested learning documents determined by at least one of the professional parsing algorithms and at least one of the non-professional parsing algorithms.

17. The computer program product of claim 15, wherein the stored professional data comprises document type data determined by at least one of the professional parsing algorithms and at least one of the non-professional parsing algorithms.

18. The computer program product of claim 15, wherein the stored professional data is modified when one or more new ingested learning documents are scored by at least one of the professional parsing algorithms and at least one of the non-professional parsing algorithms.

19. The computer program product of claim 15, further comprising:
    training the machine learning model, wherein the training is accomplished by crawling ingested learning documents for text, generating scores of the ingested learning documents, and storing the scores of the ingested learning documents.

20. The computer program product of claim 15, further comprising:
    determining, by the machine learning model, a document type of the ingested writing.

* * * * *